Figure 1:
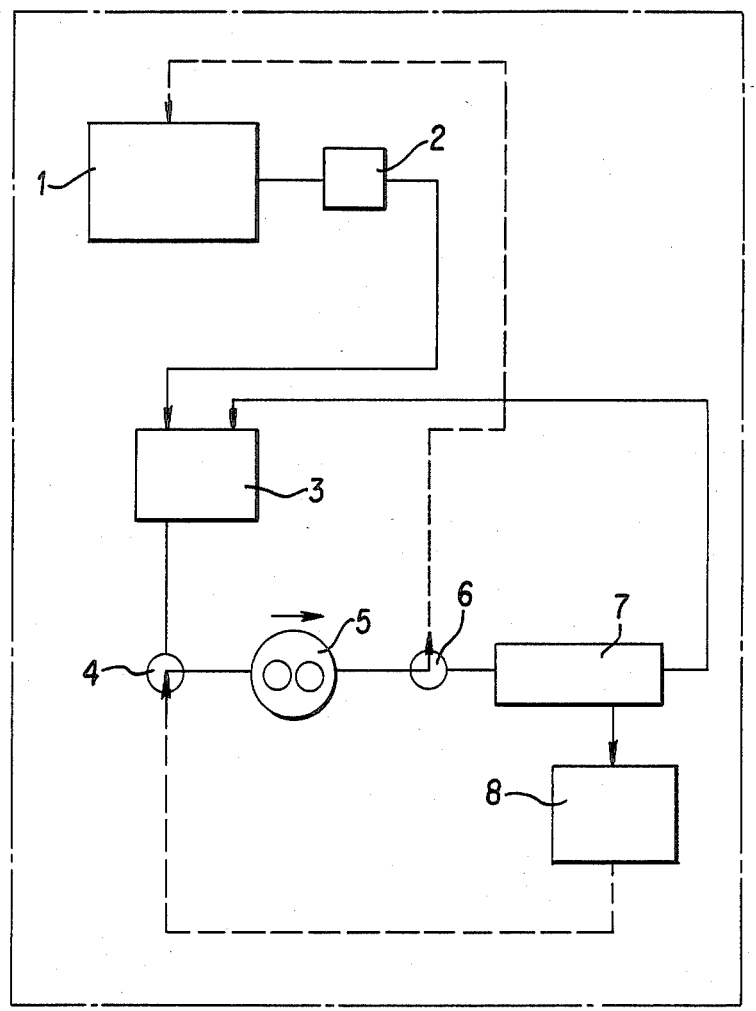

United States Patent [19]

Calloni et al.

[11] Patent Number: 4,734,207

[45] Date of Patent: Mar. 29, 1988

[54] PURIFICATION OF OILS CONTAINING SOLID MATTERS IN SUSPENSION

[75] Inventors: Enzo Calloni, Monza; Maurizio Valente; Alfonso Raiola, both of Milan, all of Italy

[73] Assignee: Ausimont S.p.A., Milan, Italy

[21] Appl. No.: 904,355

[22] Filed: Sep. 8, 1986

[30] Foreign Application Priority Data

Sep. 13, 1985 [IT] Italy ................................ 22145 A/85
Apr. 15, 1986 [IT] Italy ................................ 20080 A/86

[51] Int. Cl.⁴ .......................................... B01D 17/038
[52] U.S. Cl. .................................... 210/765; 210/788; 210/304
[58] Field of Search ............ 210/168, 194, 788, 195.1, 210/765, 196, 197, 251, 252, 254, 256, 258, 259, 260, 304, 512.1, 195.2

[56] References Cited

U.S. PATENT DOCUMENTS 4,199,443  4/1980  Tauber ................................ 210/304
4,251,375  2/1981  Pakki et al. ......................... 210/304
4,426,293  1/1984  Mason et al. ....................... 210/195.2

*Primary Examiner*—Frank Sever
*Attorney, Agent, or Firm*—Stevens, Davis, Miller & Mosher

[57] ABSTRACT

A process and apparatus for the purification of oils, such as perfluoropolyether oils or silicone oils or oils based on hydrocarbons, polluted by various impurities and in particular by solid matters in suspension, which solid matters can be filtered only with difficulty on conventional filters, comprising a filtration carried out by means of a filter of the tangential-flow type, wherein the pores of the filter element have a diameter below 0.4 micron.

5 Claims, 1 Drawing Figure

PURIFICATION OF OILS CONTAINING SOLID MATTERS IN SUSPENSION

The present invention relates to a process for the purification of oils polluted by different impurities and in particular by solid matters in suspension, which solid matters can be filtered only with difficulty on conventional filters. The process is useful, for instance, for recovering oils used as operating fluids in vacuum pumps and in apparatus of various kinds wherein the oil during the running is polluted progressively by foreign substances that may be present in the oil either in solution or in the form of finely dispersed solid matter. In many cases the dispersed solid substances are in the form either of gels or gums or mucilages, capable of forming on filters of the conventional type of a film of a practically impermeable matter that reduces the filter efficiency in a drastic way.

It is known from British Pat. No. 1,561,696 that it is very difficult or almost impossible to eliminate fine particles of foreign materials suspended or dispersed in nonconductive liquids, e.g., oils, by using a film. This British patent discloses an apparatus for the electrostatic purification of oils by using various collecting members for the impurities, inserted between anode and cathode plates, parallel to the electric field created in the apparatus. The value of the applied voltage is determined by the size of the particles, and is increased as the particles become smaller. This method is not very practical for use when a large amount of oil must be purified and is very expensive.

It is an object of the present invention to provide a very simple and efficient process for the purification of such contaminated oils, requiring only a comparatively inexpensive apparatus and an economical process.

The process and apparatus of the present invention are particularly useful for the treatment of perfluoropolyether oils, which are used in particular in vacuum pumps, in thermal tests of electronic apparatus, in etching processes in plasma employing gaseous agents such as $SiCl_4$, $CF_4$, $Cl_2$, $O_2$.

Perfluoropolyethers used in the aforesaid applications are for instance the Fomblins (registered trademark by Montedison), the Krytoxes by DuPont, and similar products known on the market under the name Tyreno (by Kluber) and Barierta, as well as the perfluoropolyethers produced according to European Pat. No. 148,482.

Several methods are known for the purification of perfluoropolyethers polluted by liquid impruities such as hydrocarbons (mineral oils); such methods are usually based on extractions by means of solvents or on chemical treatments for removing traces of water (U.S. Pat. No. 4,178,465). These methods, however, do not solve the problems concerning the removal of solid impurities and, in particular, those in the form of gels.

The process, according to the present invention, is also suitable for the treatment of other kinds of lubricating oils of different chemical nature, such as silicone oils and the conventional types based on hydrocarbons.

The basic operations involved in the process according to the present invention, comprise:

an optional degassing for removing volatile products, carried out in particular by blowing an inert gas, such as nitrogen, into the oil kept at room temperature or at a temperature higher than room temperature;

a filtration for removing the solids in suspension, carried out by means of a filter of the tangential-flow type, wherein the liquid to be filtered is passed at high speed on the filtering surface, thus avoiding the formation of a deposit of solid material on the surface itself. The diameter of the pores of the filtering surface must be very small in order to achieve a complete separation of the smallest solid particles as well as of the larger particles. Diameters below 0.4 micron are required, and preferably of the order of about 0.2 micron.

A type of filter suitable for carrying out the aforesaid filtration is one produced by the Firm Membrana Inc. (U.S.A.) and put on the marked under the names "DYNA-SEP" and "PHARMA-SEP". The filtering surface of such a filter consists or consists essentially of a cylinder or of a tubular element made of porous polypropylene, in the inner portion of which the liquid to be filtered is passed at a high speed, and is kept at a pressure higher than the pressure outside the tubular surface. The filtrate leaving the tubular filtering surface is collected, while the liquid to be filtered is recycled continuously, until the concentration in solid substance is suspension has reached a very high value. The pressure at which the liquid to be filtered may be brought depends on the characteristics of the apparatus which may work at a pressure of up to 4 bar at the most.

The temperature of the liquid is an important factor as well: the temperature limit, however, cannot be exceeded; it is determined by the resistance of the material the filter element is made of. That temperature limit is 60° C. for the filters indicated hereinbefore.

The process according to the present invention may also comprise additional accessory operations, such as a previous decantation for a preliminary separation of coarser solid substances and of possible immiscible liquid impurities, and a previous filtration on a filter capable of separating the coarser particles in order to lower the solids content in the liquid to be conveyed to the tangential-flow filter.

The perfluoropolyether or the mineral oil, after filtration in the filter of the tangential flow type according to the present invention, may be used directly as such in a vacuum pump as the operative fluid, or it may be subjected to a neutralization in order to eliminate acid or basic substances if present. In particular, the neutralization of oils having acid impurities may be carried out with a cartridge charged with activated alumina, active carbon, or soda.

The device for filtration according to the present invention consisting essentially of a tangential flow filter of the type above defined, may be applied to any type of vacuum pumps known in the prior art, using an operating fluid of the type of lubricating oils, by means of suitable connections and ancillary devices (valves, circulation pump, and possibly means for heating or cooling the oil to be filtered), which enable it to be used also in continuous and automatic operation.

In particular, the circulation pump must ensure an adequate tangential speed of oil inside the filter.

A suitable installation diagram is shown in FIG. 1.

In it, with the following reference numbers, the following components are indicated:

(1) A vacuum pump;

(2) An oil drain valve, which may be of automatic, intermittent or continuous operation type;

(3) A reservoir for collecting the oil to be filtered; it operates also as a storage unit for the oil recycled from/to the filter;

(4) A three-way valve for placing the inlet (intake) of pump (5) alternatively in connection either with the reservoir of oil to be filtered (3) or with the tank of filtered oil (8);

(5) A gear pump;

(6) A three-way valve for placing the outlet from pump (5) in communication respectively either with the filter (7) or with the vacuum pump (1);

(7) A filtering unit;

(8) A collecting tank for filtered oil.

The connection diagram as shown in the figure is suitable for semicontinuous operation.

The filter operation is periodically discontinued for a short time, to allow the gear pump (5) to send back the filtered oil to the vacuum pump (1). Adapting the device for operating on a completely continuous cycle is easily possible in a perfectly obvious way.

The purification of a few typical kinds of oils is now described only by way of illustration.

EXAMPLE 1

Product to be purified: 12 Kg of Fomblin Y L VAC 25/5 oil used in pumping assemblies of an apparatus for etching in plasma utilizing $SiCl_4$, $CF_4$, $Cl_2$, or $O_2$ as gaseous agents. The product, light brown colored, showed solid substances in suspension in the form of gel. After decantation over a period of three weeks no separation of distinct phases was achieved. A degassing was carried out on the product kept at 50° C. in a heated metal container, by blowing in nitrogen at 135 l/h for 4 hours into said product.

The degassed product was then subjected to a preliminary filtration by means of a filter whose pores had a diameter of 15 microns, working at an over pressure of 0.7 bar.

Then filtration was begun in a DYNA PHARMA filter, having a filter element whose pores had a diameter of 0.2 micron, the filter cartridge being about 51 cm in length, and the filtering surface being about 19.5 dm².

Operating conditions: temperature from 50° to 55° C., inlet pressure 2.2 bar, outlet pressure 0.8–0.9 bar.

The filtration was carried out until 11.3 Kg of oil were recovered, equal to 94% by weight of the starting product. The average filtration speed was 11.5 l/h.

EXAMPLE 2

Product to be purified: about 10 Kg of Fomblin Y L VAC, coming from an apparatus for ionic Implanter, polluted, among other things, by $PH_3$ and $AsH_3$. Decantation: after two weeks of decantation a distinct liquid phase, brown colored, was formed. The main phase was separated and then the prefiltration was started by means of a filter consisting of cellulose nuitrate whose pores had a diameter of 25 microns. The liquid to be filtered was kept at 60° C.

The prefiltered liquid was then conveyed to a tangential flow filter with a filter cartridge as in Example 1. The filtration temperature was 60° C., the inlet pressure 2.2 bar, and the outlet pressure 0.8–0.9 bar.

An average filtration speed of 7.7 l/h was noted.

COMPARISON EXAMPLE 2A

The prefiltered liquid was subjected to filtration on a vacuum filter of the conventional type with a filtering membrane made of cellulose nitrate whose pores had a diameter of 0.8 micron. The filtration speed decreased very quickly and after 1 hour the filter became completely obstructed, and the amount of collected filtrate was negligible.

EXAMPLE 3

The product to be purified consisted of 5 kg of Wacker AN 30 silicone oil used in the pumping assemblies of an apparatus for etching in plasma utilizing $CCl_4$, $SiCl_4$, $O_2$, $N_2$ as gaseous agents. The product was light brown colored and although it contained solid matter in suspension in the form of gel, after a decantation over a period of three weeks no separation of distinct phases was achieved.

A degassing was carried out on the product kept at 50° C. in a heated metal container, by blowing in a flow of nitrogen at 135 l/h for 4 hours.

Then filtration was started in a PHARMA-SEP filter of about 25 cm, and a filter surface of about 6.32 dm², and having a filter element whose pores had a diameter of 0.2 micron. Operating conditions: t°=50° C., inlet P=1.5 bar, outlet P=1 bar, average filtration speed=3 l/h.

Then the filtration was repeated in the same PHARMA-SEP filter, as described above.

The working pressures were varied: inlet P=1.8 bar, outlet P=1.2 bar, t°=50° C. The average filtration speed turned out to be about 3.6 l/h.

In both series of test the filter did not give any indication of obstruction.

EXAMPLE 4

The product to be purified consisted of 5 Kg of Edwards 15 mineral oil used in the pumping assemblies of an apparatus for "Ion implantation" utilizing $PH_3$, $AsH_3$, $N_2$ as gaseous agents. The product was dark colored and showed solid matters in suspension in the form of dark stuff and gels.

A degassing was carried out on the product kept at 50° C. in a heated metal container, by blowing in a nitrogen flow at 135 l/h for 4 hours into said product.

Then filtration was started in a PHARMA-SEP filter of the same type as described above in Example 3. Operating conditions: t°=50° C., inlet P=1.6 bar, outlet P=1 bar. Average filtration speed=1.2 l/h Then the filtration was repeated in the same PHARMA-SEP filter as described above. The working pressures were varied: inlet P=14 bar, outlet P=0.8 bar, t°=50° C. The average filtration speed turned out to be about 1.1 l/h. In both series of tests the filter did not give any indication of obstruction.

COMPARATIVE EXAMPLE 5

In a pump Alcatel 2012C, as the lubrricating fluid the perfluoropolyether (PFPE) Fomblin micron L-Vac 25/6 micron=2700 (at T=20° C.), contaminated with $SiO_2$ in the form of solid particles was used.

The vacuum measured after 1 hour was $10^{-3}$ torr. After 60 days of pump operation, the vacuum measured was $10^{-2}$ torr.

EXAMPLE 6

The same pump as in the preceding Example 5 was used with the same contaminated oil as in that example; but this time the pump was equipped with a tangential filter manufactured by the firm Membrana Inc. (U.S.A.), and marketed under the trade names "Dyna Sep" and "Pharmas Sep", with the filtering surface comprising pores having diameter of the order of 0.2 micron.

This filter was inserted into the system as shown in FIG. 1 as element 7.

After 60 days of pump operation, the vacuum measured was still $10^{-3}$ torr.

What is claimed is:

1. A process comprising: purifying oils selected from the group consisting of perfluoropolyether oils, and silicone oils, and oils based on hydrocarbons, from different impurities and in particular solid matters in suspension which can be filtered only with difficulty on conventional filters, by providing a filter of the tangential-flow type, wherein the pores of the filter element have a diameter below 0.4 micron, feeding the oil to be filtered to the said filter at high speed sufficient to avoid formation of solid deposits on the surface of said element.

2. A process according to claim 1, wherein the filtration on the tangential-flow filter is preceded by a degassing treatment by means of a flow of inert gas and/or a preliminary filtration on a conventional filter.

3. A process according to claim 1, wherein the tangential-flow filter is provided with a filter element whose pores have a diameter of about 0.2 micron.

4. A process according to claim 1, wherein the filter element consists essentially of porous polypropylene.

5. A process according to claim 1, wherein the oil to be purified is subjected to a previous decantation, in order to remove preliminarily possible liquid impurities immiscible with the oil.

* * * * *